(12) United States Patent
Ostrobrod

(10) Patent No.: US 10,004,926 B2
(45) Date of Patent: Jun. 26, 2018

(54) REMOTE OVERHEAD ANCHOR

(71) Applicant: Meyer Ostrobrod, Philadelphia, PA (US)

(72) Inventor: Meyer Ostrobrod, Philadelphia, PA (US)

( * ) Notice: Subject to any disclaimer, the term of this patent is extended or adjusted under 35 U.S.C. 154(b) by 0 days. days.

(21) Appl. No.: 15/296,144

(22) Filed: Oct. 18, 2016

(65) Prior Publication Data

US 2018/0104519 A1   Apr. 19, 2018

(51) Int. Cl.
*A62B 35/00* (2006.01)
*F16B 45/02* (2006.01)
*F16M 13/02* (2006.01)

(52) U.S. Cl.
CPC ........ *A62B 35/0068* (2013.01); *F16B 45/025* (2013.01); *F16M 13/022* (2013.01); *F16M 13/027* (2013.01)

(58) Field of Classification Search
CPC ............ A62B 35/0068; A62B 35/0075; A62B 35/0081; A62B 35/0043; A62B 35/005; F16M 13/022; F16M 13/027; F16B 45/025
USPC ............ 294/85, 86.18, 86.19, 110.1, 110.25; 248/231.85, 544, 689, 61, 229.1, 229.11, 248/72, 74.1, 340, 343
See application file for complete search history.

(56) References Cited

U.S. PATENT DOCUMENTS

| | | | | |
|---|---|---|---|---|
| 1,497,208 A | * | 6/1924 | Calvert, Sr. ............. | B44D 3/14 248/340 |
| 4,163,576 A | * | 8/1979 | Hoop ..................... | F21V 21/02 294/92 |
| 4,258,895 A | * | 3/1981 | Rorie ................... | F16M 13/022 248/317 |
| 4,407,391 A | * | 10/1983 | Greenway ............... | A63B 27/00 182/133 |
| 4,417,713 A | * | 11/1983 | Snowden ............. | F16M 13/022 248/228.4 |
| 5,415,446 A | * | 5/1995 | Olson ................ | A62B 35/0068 294/82.24 |

(Continued)

*Primary Examiner* — Muhammad Ijaz
(74) *Attorney, Agent, or Firm* — Norman E. Lehrer

(57) ABSTRACT

A remote overhead anchor for use at an elevated overhead position and adapted to be secured to a horizontally extending structural member. The anchor includes first and second substantially half ring members that are hinged together at their bottoms. The members can move between a closed position wherein they lie in substantially the same plane and an open position wherein the tops are separated from each other so that they lie in different planes. A spring biases the members into the closed position. The tops of the members include cam surfaces arranged such that when said first and second half ring members are moved upwardly and engage a horizontal structural member, the structural member causes the cam surfaces to move away from each other to move the half ring members into the open position. A spring biased lock prevents the half ring members from opening but can be deactivated remotely so that the anchor can be removed by a worker standing on the ground. A conically shaped receiver adjacent the bottom of the anchor receives the upper end of an elongated vertically extending pole for attaching and detaching the anchor to and from the overhead support.

4 Claims, 3 Drawing Sheets

(56) References Cited

U.S. PATENT DOCUMENTS

| | | | | |
|---|---|---|---|---|
| 6,648,411 B2* | 11/2003 | Julien | ................... | A47D 13/105 |
| | | | | 297/273 |
| 7,673,917 B2* | 3/2010 | Oliason | ................... | B66C 1/422 |
| | | | | 294/110.1 |
| 8,366,162 B2* | 2/2013 | Imlach | ....................... | B66C 1/30 |
| | | | | 294/110.1 |
| 8,764,774 B2* | 7/2014 | Sigmon, Jr. | .......... | A61B 17/122 |
| | | | | 24/535 |

* cited by examiner

US 10,004,926 B2

REMOTE OVERHEAD ANCHOR

BACKGROUND OF THE INVENTION

The present invention is directed toward a remote overhead anchor and more particularly, toward such a remote overhead anchor adapted to be secured to an overhead beam or similar structure to support the worker along with a personal fall arrest or protection system.

When a workman is working in high places in buildings and other structures, OSHA and the safety rules and regulations in most states and foreign countries require the use of a personal fall arrest or protection device. Such devices protect a workman from injury by quickly slowing and then stopping further downward motion in the event the workman falls from an elevated position. Such fall protection devices are, per se, well known in the art. See, for example, U.S. Pat. Nos. 4,511,123 and 5,829,548, both of which issued to the present applicant. The entire contents of these prior patents are incorporated herein by reference.

In use, the workman wears a harness which is connected to a retractable cable coming from the fall protection device. In order for the system to operate properly, however, the cable must extend downwardly from a position above (or at least at or near the height) where the workman is working. This requires that either the fall protection device or at least a pulley for the cable be located at an elevated position above the workman.

Unfortunately, there are many situations where there simply is no anchor or the like in the vicinity of where the fall protection device or cable pulley must be located. Frequently, there is nothing present but overhead rafters or beams or similar structures. A solution to this problem is to secure an anchor to the rafter or other structure and to then attach the fall protection system to the anchor.

The problem still exists, however, as to how to get the anchor into place and how to remove it. Climbing a ladder to place the anchor in position creates more of a safety problem and obviously makes the situation even more dangerous. Furthermore, safety rules require that there be a means for preventing the anchor from inadvertently disengaging the overhead beam or rafter or other structure.

A need exists, therefore, for a fall protection anchor that makes it easy for a worker from the ground to quickly place the same in position overhead and which makes it easy to remove the same while still preventing the inadvertent disengagement of the anchor.

SUMMARY OF THE INVENTION

The present invention is designed to overcome the deficiencies of the prior art discussed above. It is an object of the present invention to provide an overhead anchor that can be attached to and removed from an overhead horizontally oriented beam or other structural member from the ground.

It is another object of the present invention to provide such an anchor which includes a locking member to prevent the anchor from inadvertently opening when installed on the overhead structural member.

It is a still further object of the present invention to provide such an anchor that includes a means for remotely unlocking the locking member by a workman on the ground.

In accordance with the illustrative embodiments demonstrating features and advantages of the present invention, there is provided a remote overhead anchor for use at an elevated overhead position and adapted to be secured to a horizontally extending structural member. The anchor includes first and second substantially half ring members that are hinged or otherwise pivoted together at their bottoms. The members can move between a closed position wherein they lie in substantially the same plane and an open position wherein the tops are separated from each other so that they lie in different planes. A spring biases the members into the closed position. The tops of the members include cam surfaces arranged such that when said first and second half ring members are moved upwardly and engage a horizontal structural member, the structural member causes the cam surfaces to move away from each other to move the half ring members into the open position. A spring biased lock prevents the half ring members from opening but can be deactivated remotely so that the anchor can be applied and removed by a worker standing on the ground. A conically shaped receiver adjacent the bottom of the anchor receives the upper end of an elongated vertically extending pole for attaching and detaching the anchor to and from the overhead support.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 4:
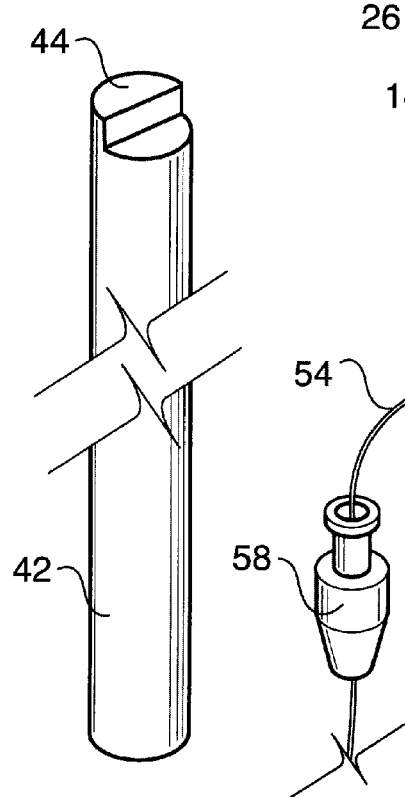
FIG. 4 is a front perspective view of the top end of the elongated vertical pole used to install and uninstall the anchor on the overhead support.
Figure 1:
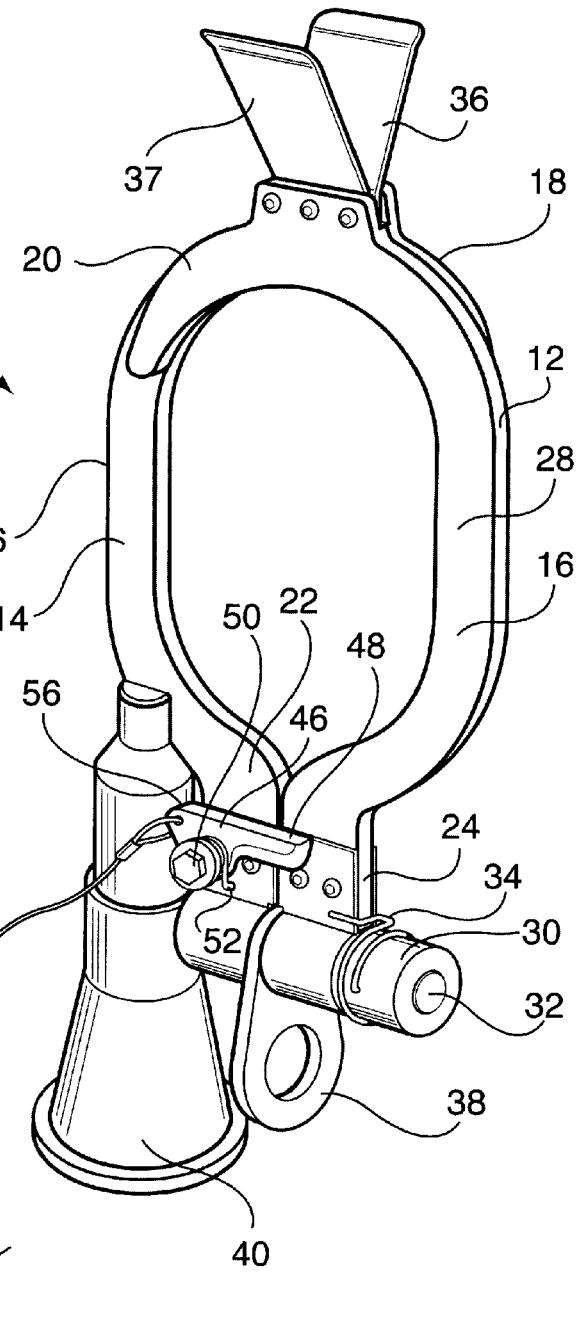
FIG. 1 is a front perspective view of the remote overhead anchor of my invention.
Figure 2:
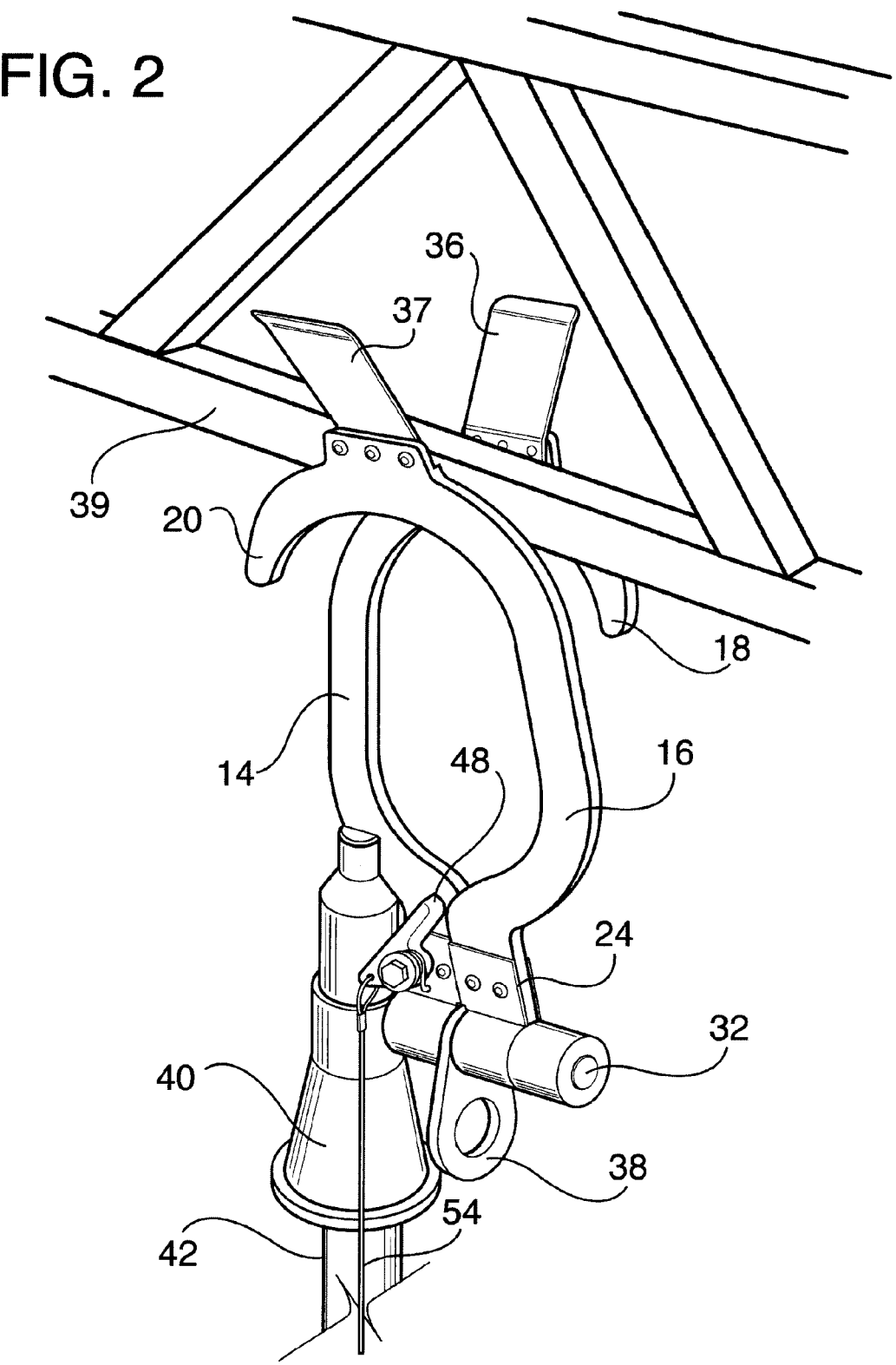
FIG. 2 is a front perspective view similar to FIG. 1 but showing the anchor as it is being positioned onto an overhead horizontal structural support.
Figure 3:
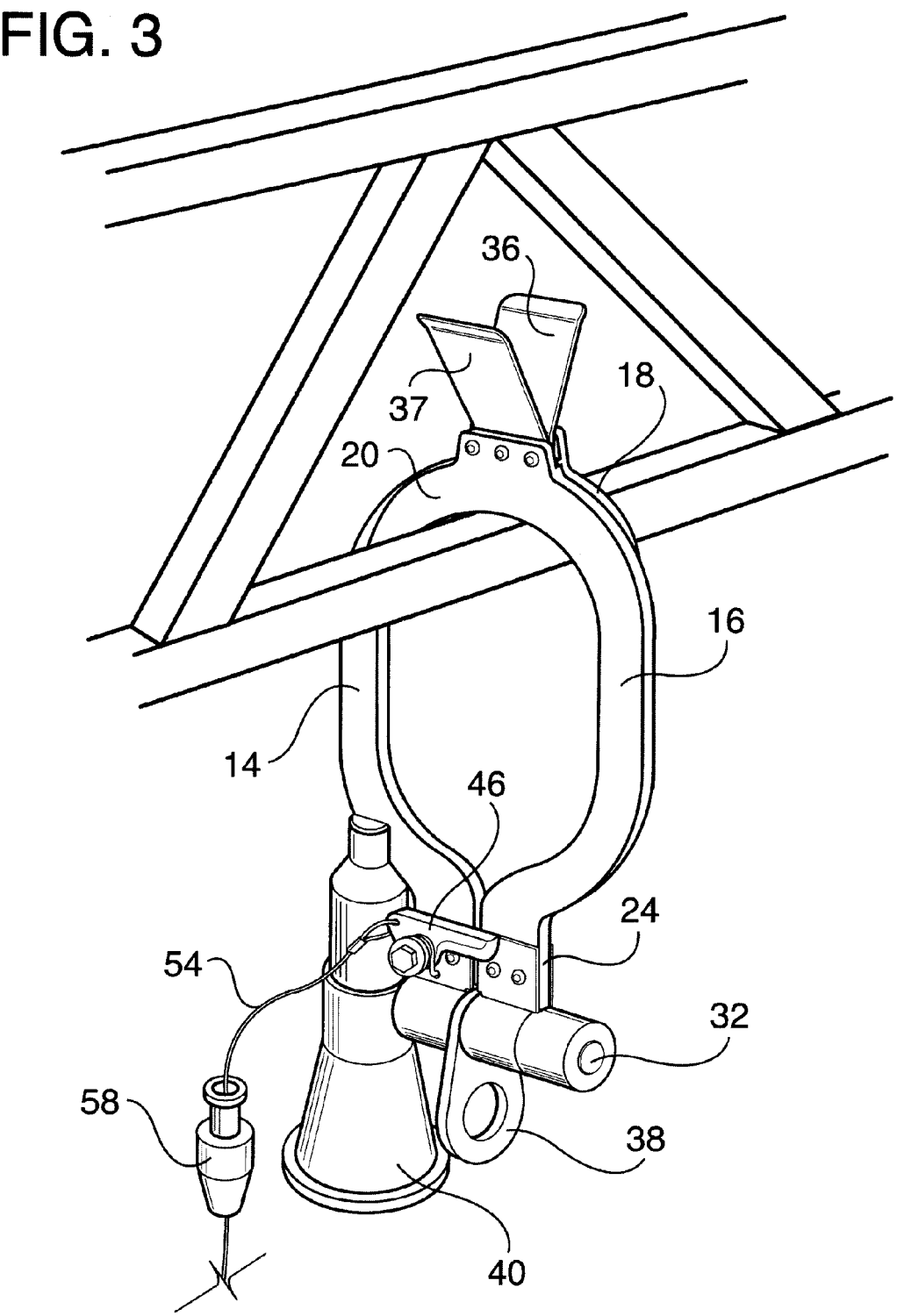
FIG. 3 is a front perspective view similar to FIG. 1 showing the anchor positioned on and supported by the overhead horizontal structural support.

Referring now to the drawings in detail wherein like reference numerals have been used throughout the various figures to designate like elements, there is shown in FIGS. 1-3 a remote overhead anchor constructed in accordance with the principles of the present invention and designated generally as 10.

The remote overhead anchor 10 is comprised of a substantially circular or oval-shaped ring 12 comprised of first and second substantially half ring members 14 and 16. Each of the half ring members 14 and 16 includes a top 18 and 20, a bottom 22 and 24 and a side 26 and 26, respectively.

A hinge means 30 is connected to the bottoms 22 and 24 of the half ring members 14 and 16. The hinge means 30 is comprised of a shaft or axle 32 to which the bottom 22 of the half ring member 14 is fixed. The bottom 24, however, of the half ring member 16 is capable of rotational or pivotal movement about the shaft 32.

As a result of the foregoing arrangement, the first and second half ring members 14 and 16 can be moved between a first closed position such as shown in FIGS. 1 and 3 wherein the members 14 and 16 lie in substantially the same plane and a second position such as shown in FIG. 2 wherein the tops 18 and 20 of the half ring members 14 and 16 are separated from each other and lie in different planes. A first spring 34 biases the half ring members 14 and 16 into the closed position as shown in FIGS. 1 and 3. Although the spring 34 is shown external to the hinge 30, it obviously could be built into the mechanism so as not to be exposed.

Attached to the tops 18 and 20 of the first and second half ring members 14 and 16 are cam surfaces 36 and 37, respectively. These cam surfaces 36 and 37 are arranged such that when the anchor 10 is moved upwardly and engages a horizontal structural member such as shown at 39 (see FIG. 2) the first and second half ring members 14 and 16 move away from each other from the closed position to the open position as shown in FIG. 2. As the anchor 10 continues to move upwardly, it can then be rotated so that the upper ends 18 and 20 can close under the force of the spring 34 so as to be in the position shown in FIG. 3.

Also connected to the bottom of the half ring members 14 and 16 is a ring 38. Preferably, the ring 38 is supported by the axle 32 so that it can have some limited movement. The ring 38 is used for the attachment of a safety harness or fall or arrest protection equipment or the like as is, per se, well known in the art.

In addition, secured to the lower half 22 of the half ring member 14 is an inverted conical member 40. Preferably, the axle 32 is also secured to the conical member 40. An elongated pole 42 is adapted to fit within the conical member 40 from below so as to be able to raise and lower and otherwise maneuver the anchor 10. The elongated pole 40 is preferably telescopic so that it can extend a substantial height to reach overhead structural support members that may be 20 or 30 or more feet above the floor.

The top 44 of the elongated pole 42 has a non-circular shape such as the semi-circle shown in FIG. 1. This is, of course, by way of example only. Substantially any non-circular shape 44 at the top of the pole 42 is possible. The upper part of the interior of the conical member 40 has a cooperating complimentary non-circular shape that is adapted to receive the top 44 of the pole 42. This allows the user on the floor to rotate and otherwise maneuver the anchor 10 by rotating the pole 42. Because the member 40 has an interior conical shape, the top 44 of the pole 42 is guided into place when the user wishes to insert the pole into engagement with the anchor 10.

Although the half ring members 14 and 16 are movable between the closed position shown in FIGS. 1 and 3 and the open position shown in FIG. 2, they are preferably locked into the closed position through the use of the locking mechanism 46. The lock 46 is essentially a lever 48 that is pivoted at 50 to the half ring member 14. When in the down or locked position as shown in FIGS. 1 and 3, the lever 48 prevents the half ring member 16 from pivoting forward into its open position. This prevents the members 14 and 16 from separating inadvertently when in the closed position and suspended on the structural member 39 as shown in FIG. 3.

A spring 52 biases the lock 46 into the locked position. An elongated line 54 which may be of a flexible wire or string or substantially any other material is attached to the remote end 56 of the lock lever and is preferably long enough to reach to the floor. That is, the line 54 will be substantially the same length as the pole 42. A gripping member 58 can be freely moved along the line 54 into the position desired. By pulling down on the line 54 through the use of the gripping member 58, the lock 46 can be moved into its open or unlocked position as shown in FIG. 2.

When it is desired to install the anchor 10 in an overhead position such as onto an overhead beam or similar structure, a harness or fall protection device is first attached to the ring 38. Thereafter, the top 44 of the elongated pole 42 is inserted up into the cone 40 and rotated it engages it complimentary receiver in the top of the cone. Thereafter, the anchor is lifted by the use of the elongated pole 42 until it engages the overhead horizontal beam 39. The line 54 is then pulled down to release the lock 48. As the anchor 10 continues to move upwardly, the cams 36 and 37 move the half ring 16 forwardly into the open position. After further upward movement, the anchor 42 is rotated and the half ring members 14 and 16 move into their closed position by the spring 34. At this point, the line 54 is released so that the lock 48 engages.

When it is desired to remove the anchor 10 from the beam 39, the elongated pole 42 is moved upwardly so that the top 44 enters the cone 40 and eventually engages the cooperating part at the top of the cone. To ensure that it is properly in place, the pole 42 is rotated slightly until it locks in place. The pole is then moved upwardly thereby moving the anchor 10 upwardly until the ends of the tops 18 and 20 clear the beam 39. At this point, the line 54 is pulled downwardly to release the lock 46 and the anchor 10 is rotated by rotating the pole 40 whereby the beam 39 causes the half ring members 14 and 16 to separate or move into their open position. At this point, the anchor 10 can be moved downwardly to clear the beam 39.

The present invention may be embodied in other specific forms without departing from the spirit or essential attributes thereof and accordingly, reference should be made to the appended claims rather than to the foregoing specification as indicating the scope of the invention.

I claim:

1. A remote overhead anchor for use at an elevated overhead position and adapted to be secured to a horizontally extending structural member comprising:
    first and second substantially half ring members, each of said half ring members includes a top, a bottom and a side, the tops of said half ring members being long enough to overlap each other;
    hinge means connected to the bottom of said half ring members, said hinge means allowing said half ring members to move between a first closed position wherein said half ring members define and lie in substantially a same plane but where said tops of said half ring members overlap each other and lie side by side next to each other and a second open position wherein said tops of said half ring members are separated from each other wherein said half ring members lie in different and nonparallel planes, said hinge means including a hinge axis that lies in and is parallel to said same plane and said different planes;
    first spring means biasing said half ring members into said first closed position;
    first and second cam surfaces adjacent the tops of said half ring members, respectively, said cam surfaces being arranged such that when said half ring members are moved upwardly and engage a horizontal structural member, the structural member causes said cam surfaces to move away from each other to move said half ring members into said second open position;
    locking means secured to said half ring members, said locking means being movable between a locking position for maintaining said half ring members in said first closed position so that said half ring members cannot move into said second open position and an unlocked position wherein said half ring members can move into said second open position;
second spring means for biasing said locking means into said locking position, and
manually operable remote actuator means for moving said locking means into said unlocked position.

2. The anchor as claimed in claim 1 further including a receiver adjacent the bottom thereof adapted to receive an upper end of an elongated vertically extending pole, said remote actuator means including a cord.

3. The anchor as claimed in claim 2 wherein said receiver and upper end of said pole are so constructed such that rotation of the pole causes said anchor to rotate and when said anchor rotates to engage said horizontal structural member, said half ring members move into said second open position only when said remote actuator means is in its unlock position.

4. The anchor as claimed in claim 2 wherein at least a portion of said receiver is conically shaped in order to guide said upper end of said pole into said receiver.

\* \* \* \* \*